United States Patent [19]

Pirkle

[11] 4,179,728

[45] Dec. 18, 1979

[54] CAPACITOR CHARGING CIRCUIT

[75] Inventor: Sherman J. Pirkle, Waltham, Mass.

[73] Assignee: Hewlett-Packard Company, Palo Alto, Calif.

[21] Appl. No.: 839,076

[22] Filed: Oct. 3, 1977

[51] Int. Cl.² .................... H02M 3/24; H02J 15/00
[52] U.S. Cl. ............................... 363/59; 363/74; 320/1
[58] Field of Search ............ 363/59, 64, 74, 15–16; 320/1; 307/110; 323/43.5 S

[56] References Cited

U.S. PATENT DOCUMENTS

| | | | |
|---|---|---|---|
| 3,376,491 | 4/1968 | Mas | 363/74 |
| 3,654,537 | 4/1972 | Coffey | 320/1 |
| 3,706,022 | 12/1972 | Corey et al. | 320/1 |
| 3,821,635 | 6/1974 | Kimmel et al. | 320/1 X |
| 4,075,536 | 2/1978 | Stevens | 363/74 X |

Primary Examiner—J D Miller
Assistant Examiner—Peter S. Wong
Attorney, Agent, or Firm—Donald N. Timbie

[57] ABSTRACT

A capacitor is charged to high voltages from a low voltage source of low energy capacity in a more efficient manner by charging the turn ratio of a transformer coupled between the inverter and rectifier in arbitrarily related slope as the voltage reaches predetermined levels.

13 Claims, 2 Drawing Figures

CAPACITOR CHARGING CIRCUIT

This invention relates to more efficient apparatus for charging a capacitor to a high voltage from a low direct current voltage source. It has been customary to use an inverter to change the direct current voltage supplied by the source into an alternating current voltage and to increase this voltage to the required terminal value in one step before applying it to a rectifier that supplies the direct current for charging the capacitor. The theoretical maximum efficiency attained by such apparatus is 50%. In accordance with this invention the efficiency is made to be greater than 50% by increasing the turns ratio of the transformer in steps as the voltage across the capacitor reaches predetermined levels below the terminal value. Greatest efficiency is attained if the turns ratios are arithmetically related.

THE DRAWINGS

Figure 1:
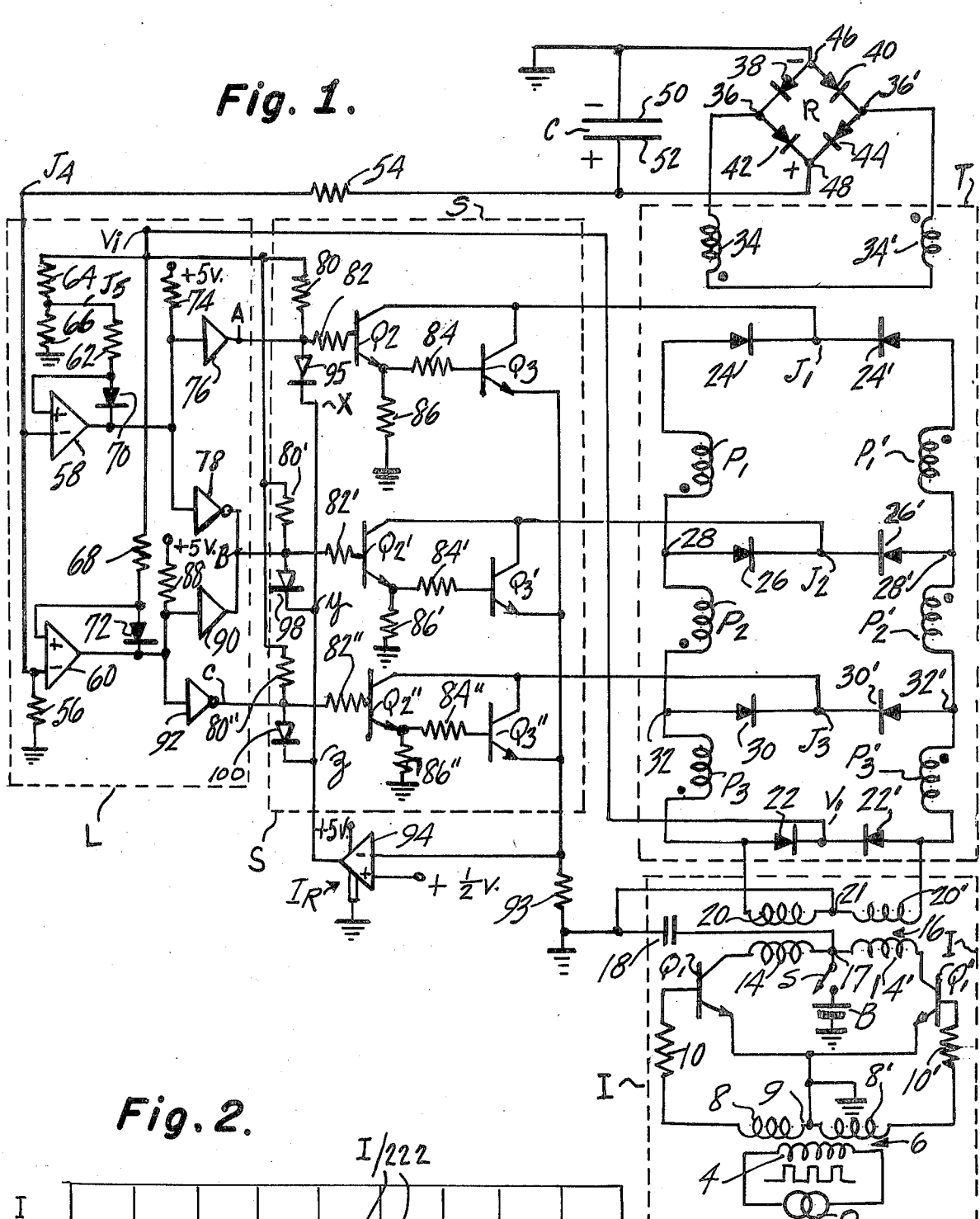
Figure 2:
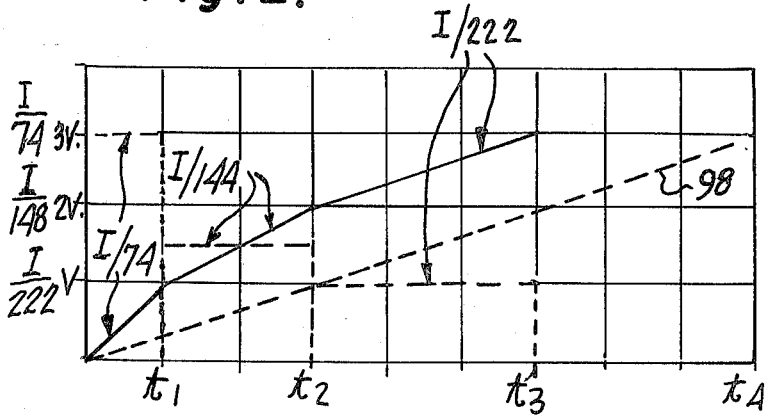

FIG. 1 is a schematic diagram of a circuit for charging a capacitor in accordance with this invention, and FIG. 2 is a set of graphs useful in explaining the operation of the invention.

THE CAPACITOR CHARGING CIRCUIT

In general terms the circuit of FIG. 1 is comprised of an inverter I having a battery B that serves as the power source, an oscillator O, and a transformer T, the turns ratio of which is controlled in accordance with this invention. The circuit also includes a rectifier R, a capacitor C to be charged, logic circuits L for controlling the switches S so as to select the turns ratio of the transformer T in response to the voltage across the capacitor C, and a current regulator IR.

Specifically, the oscillator O is coupled to a primary winding 4 of a transformer 6 having secondary winding sections 8 and 8' that are grounded at a center tap 9. The emitters of transistors $Q_1$ and $Q_1'$ are connected to the center tap 9, and the bases are respectively connected to the outer ends of the secondary windings 8 and 8' via resistors 10 and 10'. The collectors of $Q_1$ and $Q_1'$ are respectively connected to the outer ends of sections 14 and 14' of the primary winding of a coupling transformer 16. The inner ends of the sections 14 and 14' are connected to a center tap 17 that is connected to the positive side of the battery B via a switch S and bypassed to ground by a capacitor 18. The negative side of the battery B is connected to ground. The secondary winding of the transformer 16 is comprised of sections 20 and 20' having their inner ends connected to ground at a center tap 21. Diodes 22 and 22' are connected in series opposition between the outer ends of the windings 20 and 20' so as to provide a rectified voltage $V_1$ at their junction that varies with the voltage supplied by the battery B. The coupling transformer 16 may provide a voltage step up, e.g., each of the sections 14 and 14' of the primary may have twenty turns and each of the winding sections 20 and 20' of the secondary may have sixty turns.

In this particular illustration, the primary winding of the transformer T is split into two parts, one part being comprised of series sections $P_1$, $P_2$ and $P_3$ which may, for example, respectively have twenty-seven, nine, and eighteen turns, and the other part being comprised of identical corresponding series sections $P_1'$, $P_2'$ and $P_3'$. The outer ends of the winding section $P_3$ is connected to the ungrounded end of the secondary winding 20 of the coupling transformer 16, and the outer end of the winding section $P_1$ is connected via the anode cathode path of a diode 24 to a junction $J_1$. Similarly, the outer end of the winding section $P_3'$ is connected to the ungrounded end of the secondary winding 20' of the transformer 16, and the outer end of the winding $P_1'$ is connected to the junction $J_1$ via the anode cathode path of a diode 24'. Diodes 26 and 26' have their cathodes connected to a junction $J_2$ and their anodes respectively connected to points 28 and 28' between the primary winding sections $P_1$ and $P_2$, and the primary winding sections $P_1'$ and $P_2'$. The cathodes of diodes 30 and 30' are connected to a junction $J_3$ and their anodes are respectively connected to points 32 and 32' between the primary winding sections $P_2$ and $P_3$ and the primary winding sections $P_2'$ and $P_3'$.

The secondary winding of the transformer T has one section 34 magnetically coupled to the primary winding sections $P_1$, $P_2$ and $P_3$ and another section 34' magnetically coupled to the primary winding sections $P_1'$, $P_2'$ and $P_3'$. The secondary windings 34 and 34', each of which may have 2,000 turns, are connected in series between the input terminals 36 and 36' of the rectifier R. The rectifier R is comprised of a first pair of diodes 38 and 40 connected in series with opposing polarities between the input terminals 36 and 36' and a second pair of diodes 42 and 44 connected in series between the input terminals 36 and 36' with their respective polarities opposite to the polarities of the diodes 38 and 40. The grounded output terminal 46 and the output terminal 48 of the rectifier R are respectively at the junctions of the diodes 38 and 40 and 42 and 44, and they are respectively connected to opposite plates 50 and 52 of the capacitor C that is to be charged. The winding senses of the various windings of the transformer T are such that the voltages applied to the inputs 36 and 36' of the rectifier R are out of phase.

The Logic and Switching Circuits

The logic circuits L and switching circuits S successively disable the pairs of primary winding sections $P_1$ and $P_1'$ and $P_2$ and $P_2'$ as the direct current voltage across the capacitor C reaches successive predetermined levels so as to increase the voltage applied to the capacitor C in steps.

A potential divider comprised of a large resistor 54 and a small resistor 56 are connected in series between ground and the positive output terminal 48 of the rectifier R so as to provide a voltage at their junction $J_4$ that is proportional to the voltage across the capacitor C and small enough for application to the inverting inputs of open collector comparators 58 and 60 to which $J_4$ is connected. A reference voltage for the comparator 58 is applied via an isolation resistor 62 from the junction $J_5$ of resistors 64 and 66 that are connected in series between ground and the junction of the diodes 22 and 22' at which the rectified voltage $V_1$ appears. A reference voltage equal to $V_1$ is supplied to the non-inverting input of the comparator 60 via an isolating resistor 68. In order to prevent the non-inverting inputs of the comparators 58 and 60 from coming too close to ground when their outputs are low, diodes 70 and 72 are respectively connected between their outputs and their non-inverting inputs.

The output of the comparator 58 is connected to a positive voltage such as +5 v via a resistor 74, to the input of a non-inverting open collector buffer 76, and to the input of an open collector inverting buffer 78. The output of the buffer 76 is connected by a resistor 80 to a point to which $V_1$ is applied and by a resistor 82 to the base of a transistor $Q_2$. The emitter of $Q_2$ is connected to the junction of resistors 84 and 86 that are connected in series between the base of $Q_3$ and ground, and the collectors of $Q_2$ and $Q_3$ are connected to the junction $J_1$.

The output of the comparator 60 is connected to a positive voltage such as $+5$ v via a resistor 88, to the input of a non-inverting buffer 90, and to the input of an inverting buffer 92. The output of the inverting buffer 78 previously mentioned and the output of the non-inverting buffer 90 are connected to an output circuit like that described in connection with the buffer 76 in which corresponding components are indicated by the same letter or numeral primed. The collectors of $Q_2'$ and $Q_3'$ are connected to the junction $J_2$.

The output of the inverting buffer 92 is connected to an output circuit like that provided for the buffer 76 in which corresponding components are indicated by the same letters or numerals with a double prime. The collectors of the transistors $Q_2''$ and $Q_3''$ are connected to the junction $J_3$.

The current return paths from the junctions $J_1$, $J_2$ and $J_3$ are respectively through the collector-to-emitter paths of one of the transistors $Q_3$, $Q_3'$ and $Q_3''$ and a small resistor 93 to the center tap 21 between the secondary winding sections 20 and 20' of the transformer 16.

The current regulating circuit IR maintains a constant current in the primary windings of the transformer T. It is comprised of an open collector differential amplifier 94 having its output respectively connected via diodes 95, 98 and 100 to the outputs of the buffers 76, 78 and 90, and 92. The non-inverting input of the amplifier 94 is connected to a small positive voltage such as $+0.5$ v, and its inverting input is connected to one end of the resistor 93. The other end of the resistor 93 is connected to ground.

Operation

When the charging of the capacitor C is started by closing the switch S, the voltage applied to the inverting inputs of the comparators 58 and 60 is zero so that their outputs are high. Application of the high voltage from the comparator 58 through the buffer 76 to the base of $Q_2$ turns on $Q_2$ and $Q_3$ so as to provide a current return path from the junction $J_1$ through the collector and emitter of $Q_3$ to the center tap 21. No current return path is provided through $Q_3'$ for the junction $J_2$ because $Q_3'$ and $Q_2'$ are turned off by the low output from the inverting buffer 78 that dominates the high output of the non-inverting buffer 90. Nor is any return path provided through $Q_3''$ for the junction $J_3$ because $Q_2''$ and $Q_3''$ are turned off by the low output of the inverting buffer 92. In this situation, current flows through all of the primary winding sections of the transformer T so that the effective turns ratio is $4000/54 = 74$. If the current in the primary windings is I amperes, the current in the secondary windings is I/74 so that it takes until $t_1$, as shown in FIG. 2, to charge the capacitor C to V volts.

At this point, or slightly before, the reasons that will be explained, the voltage at the inverting input of the comparator 58 exceeds the reference voltage applied to its non-inverting input so as to cause its output to change from a high to a low voltage. The low voltage turns off $Q_2$ and $Q_3$ and, because of the inversion of this low voltage to a high voltage in the inverting buffer 78, $Q_2'$ and $Q_3'$ are turned on so as to provide a return path for the junction $J_2$. The transistors $Q_2''$ and $Q_3''$ remain off. Current flows through only the primary windings $P_2$ and $P_3$ and $P_2'$ and $P_3'$, so that the turns ratio becomes $4000/27 = 148$, thereby reducing the current charging the capacitor C to I/148 amperes. Accordingly, it takes twice as long for the voltage on the capacitor C to be increased by V volts so as to reach a total voltage of 2V volts at time $t_2$, as shown in FIG. 2.

At this time, the voltage applied to the inverting input of the comparator 60 is equal to the reference voltage at its non-inverting input so as to cause its output to change to a low voltage. This voltage is inverted to a high voltage in the buffer 92 so as to turn on $Q_2''$ and $Q_3''$ and provide a return path for the junction $J_3$ through $Q_3''$. Current flows only in the primary winding sections $P_3$ and $P_3'$ so that the turns ratio is $4000/18 = 222$. A current I/222, therefore, flows into the capacitor C so as to require three times as much time to increase its voltage by V volts as when the current was I/74 amperes between time zero and the time $t_1$. The capacitor C is fully charged to 3V at the time $t_3$ shown in FIG. 2.

If, however, only one turns ratio is used, as in previously known apparatus, it would have to be 222 because that is the only one high enough to provide the required voltage of 3V. The charging current would be I/222 amperes, the same as between $t_2$ and $t_3$ so that the increase in voltage would be along the dotted line 98. If the primary current I were held constant, it would take until $t_4$ to charge the capacitor C to a voltage of 3V or one and one-half times as long as when the circuit of this invention is used. The charging currents during each charging step are indicated by the dotted lines in FIG. 2.

Due to various tolerances, the voltage across the capacitor C could reach a terminal voltage that is less than the ideal switching voltage in which event the switching voltage will never be attained. Therefore, it is desirable to cause the logic circuits to change the turns ratio so as to increase the voltage at a voltage that is less than the next step. An adjustment of 10% has been found to be satisfactory to accommodate tolerance in components.

The theoretical efficiency of the charging process is the energy stored in the capacitor divided by the energy given up by the battery and is expressed by the formula:

$$(N/N+1) \times 100$$

where N equals the number of steps and where the turns ratios are arithmetically related. Thus, the efficiency of the prior art is 50% and the efficiency of the three-step charging system described is 75%. More steps could be used, but the incremental advantage becomes less, e.g., a four-step system would have an efficiency of 80%. The number of steps used is a matter of cost vs. gain in efficiency.

The graphs of FIG. 2 do not show the effect of impedance that is always present. If this were taken into account, the voltage across the capacitor C would increase less rapidly as it approached the charging voltage, but the relative advantages of charging a capacitor in accordance with this invention would be approximately the same.

The fall-off in the rate of charging the capacitor C can be compensated for by the current regulating circuit IR, which operates as follows. As the current in the active primary winding section or sections falls off, the positive voltage at the ungrounded end of the resistor 93 and at the inverting input of a differential amplifier 94 to which it is connected drops. When it gets below the positive voltage applied to the non-inverting input of the amplifier 94, the output of the amplifier becomes more positive. This decreases the current in the diode 96, 98 or 100 having its anode at a high voltage, the others being turned off. This will be the diode connected to the transistor $Q_2$, $Q_2'$ or $Q_2''$ that is conducting or active. As current from the base of this transistor decreases, the current through the transistor $Q_3$, $Q_3'$ or $Q_3''$ to which it is coupled will increase, thus restoring the primary current to its former value.

An advantage in deriving the reference potentials for the non-inverting inputs of the comparators 58 and 60 from the voltage $V_1$ is that if the voltage supplied by the battery B decreases, the charging circuit will still be able to proceed through its steps and reach the highest charging voltage that the condition of the battery will permit. If a fixed or regulated voltage were substituted in place of $V_1$, the maximum voltage to which the capacitor C can be charged may not be high enough to cause the comparator 58 to change state and cause the voltage applied to the capacitor C to increase to the next step.

It is to be noted that the improvement in efficiency is greater for lower voltage levels and that, due to design allowance for line battery variations, the maximum voltage for which it is designed to charge is almost always higher than that which could be reached under optimum conditions.

The circuits are designed so as to be able to charge the capacitor C to the desired maximum voltage even when the voltage of the battery or other source of charging energy is low. Therefore, when the voltage of the source is fairly high, it is not necessary to utilize all the voltage steps available. In this situation, the efficiency of a charging circuit utilizing this invention is even greater than that of a prior art circuit.

What is claimed is:

1. Apparatus for charging a capacitor with energy from a direct current energy source comprising,
    an inverter energized by said source so as to produce an alternating current voltage,
    a transformer coupled to said inverter,
    a rectifier coupled to said transformer,
    means coupling said rectifier to said capacitor, and
    control means responsive to the voltage on said capacitor for changing the turns ratio of said transformer from one value to another so as to increase the voltage coupled to said rectifier when the voltage on said capacitor increases through predetermined levels.

2. Apparatus as set forth in claim 1 wherein said turn ratios are arithmetically related.

3. Apparatus as set forth in claim 1 having means provided for maintaining the average current flowing in said transformer constant.

4. Apparatus as set forth in claim 1 wherein said control means is also responsive to the voltage provided by said source so as to change said turns ratio at a lower level of the voltage in said capacitor when the voltage provided by said source is lower.

5. Apparatus for charging a capacitor with energy from a battery comprising
    an inverter energized by said battery so as to produce an alternating current voltage,
    a transformer coupled to said inverter,
    a rectifier coupled to said transformer,
    means coupling said rectifier to said capacitor, and
    control means responsive to the voltage on said capacitor for changing the turns ratio of said transformer from one value to another so as to increase the voltage coupled to said rectifier when the voltage on said capacitor increases through predetermined levels.

6. Apparatus as set forth in claim 5 wherein said turn ratios are arithmetically related.

7. Apparatus as set forth in claim 5 having means provided for maintaining the average current flowing in said transformer constant.

8. Apparatus as set forth in claim 5 wherein said control means is also responsive to the voltage provided by said source so as to change said turns ratio at a lower level of the voltage in said capacitor when the voltage provided by said source is lower.

9. Apparatus for charging a capacitor comprising
    an inverter including a source of direct current voltage having first and second output terminals,
    a transformer having primary and secondary windings, one end of said primary winding being conductively connected to said first output terminal of said inverter,
    a plurality of switches, each switch being connected from a different point along said primary winding and the said second output terminal of said inverter,
    a rectifier having an input coupled to said secondary winding of said transformer, and an output coupled to said capacitor,
    first means responsive to the voltage across said capacitor when it is in a first range for closing a first switch that is connected to the point in said primary winding that is most remote from the terminal of said inverter to which said primary winding is conductively connected so as to establish a first turns ratio between said secondary winding and the portion of said primary winding between said switch and said terminal of said inverter, and
    second means responsive to the voltage in said capacitor when it is in a second range that is adjacent to and higher than said first range for opening said first switch and closing a second switch, the second switch being connected to a point on said primary winding that is closer to said first output terminal of said inverter than said first switch so as to establish a second turns ratio between said secondary winding and the portion of said primary winding between said switch and said terminal of said inverter.

10. Apparatus as set forth in claim 9 wherein said switches are transistors.

11. Apparatus as set forth in claim 9 wherein the turns ratios effected by said first and second means are arithmetically related.

12. Apparatus as set forth in claim 9 wherein an impedance is conductively connected between one side of each of said switches and said second output terminal of said inverter, and
    wherein means are provided for changing the conductivity of each of said transistors when they are conducting in response to voltage across said impedance so as to maintain a constant average current in said primary winding.

13. Apparatus as set forth in claim 9 wherein said second means operates to open said first switch and close said second switch at a lower capacity voltage as the voltage of said source decreases.

* * * * *